United States Patent [19]
Wong

[11] Patent Number: 5,388,245
[45] Date of Patent: Feb. 7, 1995

[54] MEMORY ARBITRATION METHOD AND APPARATUS FOR MULTIPLE-CYCLE MEMORY COPROCESSORS EMPLOYING A DATA CACHE UNIT AND STACK RAM

[75] Inventor: Jimmy Wong, Portland, Oreg.

[73] Assignee: Intel Corporation, Santa Clara, Calif.

[21] Appl. No.: 69,917

[22] Filed: Jun. 1, 1993

[51] Int. Cl.$^6$ ............................................. G06F 13/18
[52] U.S. Cl. ................................. 395/425; 364/239.6; 364/935.41
[58] Field of Search ...................... 395/425; 364/239.6, 364/240.5, 240.7, 935.41, 926.91

[56] References Cited

U.S. PATENT DOCUMENTS

| | | | |
|---|---|---|---|
| H1,291 | 2/1994 | Hinton et al. | 395/800 |
| 4,463,445 | 7/1984 | Grimes | 395/325 |
| 4,580,213 | 4/1986 | Hulett et al. | 364/200 |
| 4,670,839 | 6/1987 | Pilat et al. | 364/200 |
| 4,761,733 | 8/1988 | McCrocklin et al. | 364/200 |
| 4,802,161 | 1/1989 | Byars et al. | 370/85.2 |
| 4,947,368 | 8/1990 | Donaldson et al. | 364/900 |
| 5,006,982 | 4/1991 | Ebersole et al. | 395/325 |
| 5,185,872 | 2/1993 | Arnold et al. | 395/375 |

OTHER PUBLICATIONS

Smith, Alan Jay. "Cache Memories". Sep. 1982. *Computing Surveys*, vol. 14, No. 3, pp. 507–510.

*Primary Examiner*—Jack B. Harvey
*Assistant Examiner*—Michael H. Tall
*Attorney, Agent, or Firm*—Blakely, Sokoloff, Taylor & Zafman

[57] ABSTRACT

A memory coprocessor architecture and memory arbitration scheme. The coprocessor architecture includes an address generation unit (AGU), a bus control logic unit (BCL) and a combined data cache unit/stack RAM (DCUSR) unit. Each are connected through a memory arbitration unit to a data bus. The memory arbitration unit arbitrates access to the bus by assigning priorities to the coprocessor units. The AGU and the combined DCUSR are mutually exclusive coprocessors which cannot request bus access simultaneously. Hence, the AGU and the combined DCUSR are assigned equal priorities. The BCL is assigned a lower priority and must defer bus access if the AGU or the DCUSR require immediate access. The BCL is provided with a multiple entry queue for storing data temporarily pending access to the queue. A memory scoreboard mechanism is provided such that, if the queue of the BCL becomes full, the BCL can gain immediate access to the bus to allow emptying at least one entry of the queue. The combined DCU and SR share common decoders, sense amps and data paths.

4 Claims, 8 Drawing Sheets

MEMORY ARBITRATION METHOD AND APPARATUS FOR MULTIPLE-CYCLE MEMORY COPROCESSORS EMPLOYING A DATA CACHE UNIT AND STACK RAM

BACKGROUND OF THE INVENTION

1. Field of the Invention

The invention generally relates to computer microprocessors and in particular to memory arbitration schemes for use in microprocessors having multiple cycle memory coprocessor units.

2. Description of Related Art

Figure 1:
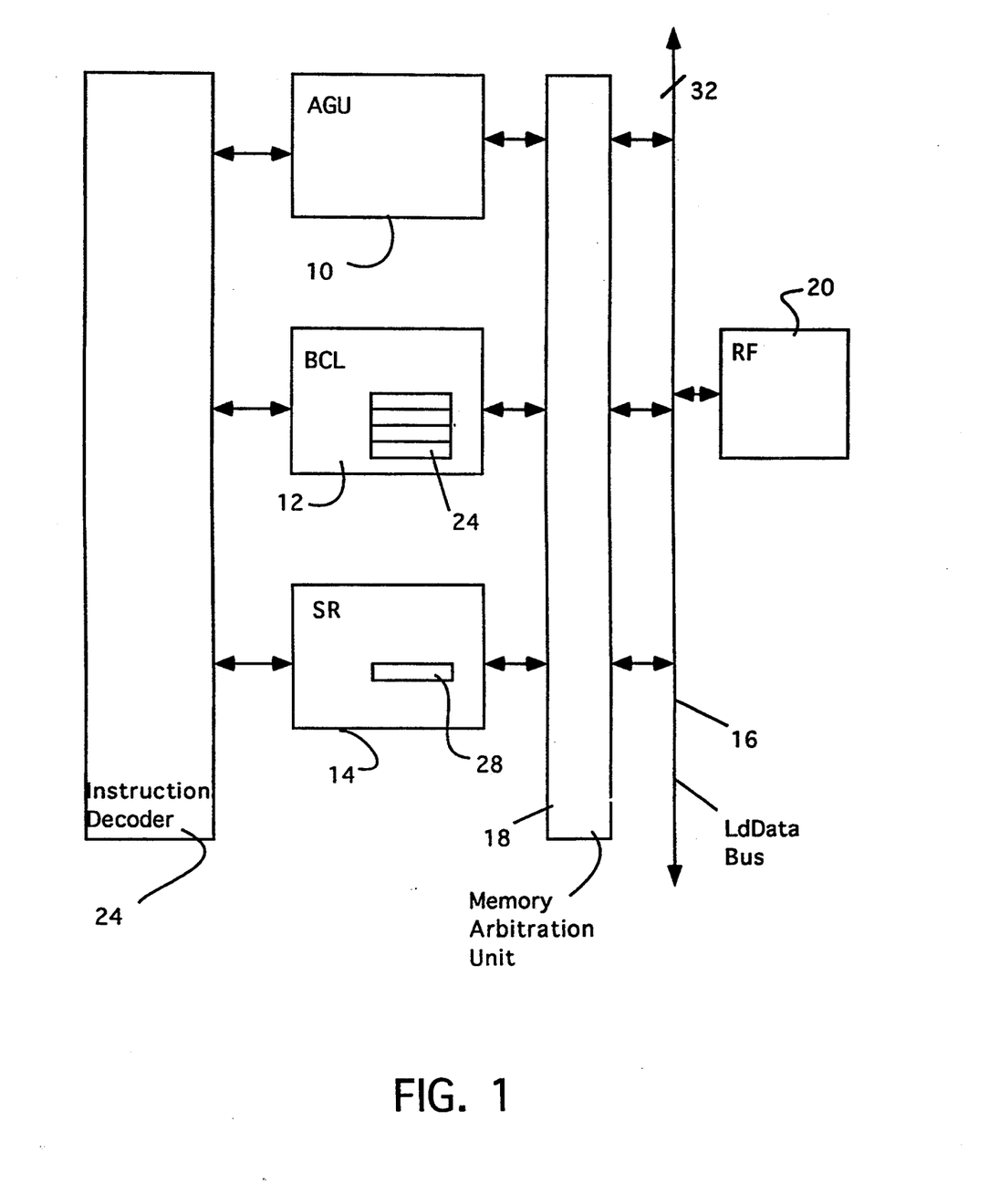
FIG. 1 is a block diagram illustrating a set of memory coprocessors and a memory bus arbitration unit within a microprocessor system.

FIG. 1 illustrates a portion of a microprocessor having a set of memory coprocessors utilizing a single data bus for transmitting data, instructions and the like retrieved from a memory (not shown). Specifically, FIG. 1 illustrates an address generation unit (AGU) 10, a bus control logic (BCL) unit 12, and a stack RAM (SR) unit 14 all connected to a LdData bus 16. Access to data bus 16 is arbitrated by a memory arbitration unit 18. Bus 16 is also connected to a register file 20 which receives and stores data, instructions, and the like transmitted by AGU 10, BCL 12 and SR 14. AGU 10, BCL 12 and SR 14 together comprise a set of memory coprocessors which operate, often in parallel, to calculate effective addresses and retrieve data from the main memory based on <load> and <lda> op-codes provided by an instruction decoder (ID) 24 and to transmit the retrieved data to register file 20. Specifically, AGU 10 calculates effective addresses based on <lda> commands. BCL 12 retrieves data from the main memory based on <load> commands. SR 14 retrieves data from internal memory stacks within the SR in responds to <load> commands.

The coprocessor architecture illustrated in FIG. 1 is exemplary of a number of microprocessor memory coprocessor architectures but, in particular, is illustrative of the Intel 960CA microprocessor provided by Intel Corporation of Santa Clara, Calif. the assignee of rights to the invention of the present application.

Although not critical for understanding the memory arbitration scheme of the memory coprocessor architecture of FIG. 1, a brief summary of the functions of AGU 10, BCL 12, SR 14 and RF 20 is provided. AGU 10 is a single cycle unit which receives <lda> memory access commands from ID 24, determines an effective address for the <lda> command and provides the effective address to BCL 12 or SR 14 which perform a memory access using the effective address. The effective address is provided over data bus 16. It should be noted that bus 16 transmits information of various types including instructions, RAM data, etc. The term "data" used herein is not limited to merely one type of internal computer information.

BCL 12 is a multiple cycle memory coprocessor which receives <load> commands from ID 24 and executes same by accessing the main memory (not shown). SR 14 responds to <load> commands from ID 24 to retrieve data from internal stack memory and transmit the data to RF 20. The effective address of the data, which determines whether the BCL or SR 14 is to retrieve the data, is calculated by the AGU. RF 20 provides registers for storing information retrieved by either AGU 10, BCL 12 or SR 14 for subsequent access by a core processing unit (not shown.) RF 20 is not the only receiver on bus 16, but depending upon the type of data placed on the bus and the entity driving the bus, other units may also act as a bus receiver. Although FIG. 1 illustrates only a single bus interconnecting the various memory coprocessors, other pathways between the memory coprocessors may be also employed.

Memory arbitration unit 18 controls access to bus 16 to prevent conflicts if more than one of SR 14, AGU 10 and BCL 14 attempts to asserts data onto bus 16 simultaneously. SR 14 and AGU 10 are single cycle memory coprocessors which must return data immediately. Because SR 14 responds only to load commands and AGU 10 responds only to mutually exclusive <lda> commands, arbitration between the AGU and the SR is not required. However, BCL 12 is a multiple cycle memory coprocessor, with arbitrary return latency such that the number of clock cycles required before BCL 12 is ready to assert data onto bus 16 is unknown. BCL 12 can attempt to return data simultaneously with either of SR 14 and AGU 10. Accordingly, conflicts can arise in accessing data bus 16 if BCL 12 seeks to assert data onto bus 16 simultaneously with either SR 14 and AGU 10.

To avoid such conflicts, memory arbitration unit 18 assigns varying priorities to SR 14, BCL 12 and AGU 10. SR 14 and AGU 10 are assigned equal priorities, greater than that of BCL 12. As noted, SR 14 and AGU 10 cannot return data simultaneously and, hence, the equal priority is not a problem. BCL 12 is assigned a bus request priority less than that of AGU 10 and SR 14, and, if conflicts arise, SR 14 and AGU 10 are ordinarily granted access to bus 16 immediately, with BCL access deferred for at least one clock cycle.

BCL 12 is provided with a four-entry input queue 26 for storing data if the BCL is not granted immediate bus access because of a simultaneous bus request by SR 14 or AGU 10. After the SR or AGU request is accommodated, BCL 12 is then granted bus access and BCL 12 retrieves the data from its four-entry queue 26 on a first-in first-out basis and asserts the data onto the bus. If several SR or AGU requests follow one after the other, BCL access may be further deferred. Should queue 26 of BCL 12 become full, BCL 12 issues a signal causing SR 14 and AGU 10 to defer access to bus 16 to allow the BCL to output one element of the queue. The signal issued by BCL 12 is a memory scoreboard signal. Any data otherwise asserted onto queue 26 by AGU 10 or SR 14 is disqualified.

Thus, circumstances arise when AGU 10 and SR 14 cannot return data immediately. If the memory scoreboard is pulled by BCL 12, AGU 10 or SR 14 must reissue the bus request which was deferred by the scoreboard mechanism.

However, an additional problem occurs even when the queue of the BCL is not full. Upon receipt of a <load> command from ID 24, SR 14 cannot immediately determine whether it (the SR) is capable of responding to the <load> command. Such a determination must wait until AGU 10 has calculated the effective address of the memory load via the <lda> command. Only after the effective address for the <load> is calculated can the SR determine whether it, rather the BCL, is the coprocessor entity capable of retrieving the data corresponding to the effective address. If SR 14 issues a bus request upon the assumption that it, and not the BCL, will be able to drive the bus, and that assumption proves false, a clock cycle is wasted before the BCL can drive the bus.

To resolve the ambiguity that SR 14 may or may not require bus access, an additional arbitration priority level is required and SR 14 is provided with a single entry queue 28. When ID 24 issues a <load> command, SR 14 "guesses" whether the SR will require bus access on a following clock cycle, and the SR issues a "guess" signal to arbitration unit 18. The "guess" signal represents a lowest level of bus priority, below even that of BCL 12. Essentially, the "guess" signal notifies memory arbitration unit 18 that the SR may require bus access on the following clock cycle. Once the effective address has been calculated by AGU 10 and the SR knows whether it (the SR) requires bus access, the SR either asserts a bus "request" or does nothing. Should memory arbitration unit 18 receive a "guess", but no other conflicting bus requests, bus access is granted immediately. However, should the memory arbitration unit receive an SR "guess" signal simultaneously with a BCL request, then the BCL request is granted. If the SR becomes ready to transmit data in the following clock cycle, i.e. if the "guess" was correct, then the SR must store the retrieved data in single entry queue 28 and issue a bus request for execution in a subsequent clock cycle.

Thus, the SR "guess" mechanism is required because of an ambiguity in whether the SR will require immediate bus access. The single entry queue is required because the BCL may be granted bus access while the SR is awaiting a resolution of the ambiguity. Of course, the SR "guess" could simply be granted a higher priority than the BCL request. However, SR memory access is fairly rare, and numerous dock cycles would be wasted on the bus by always granting access to the SR, even before it has been determined whether the SR contains the requested data.

Figure 2:
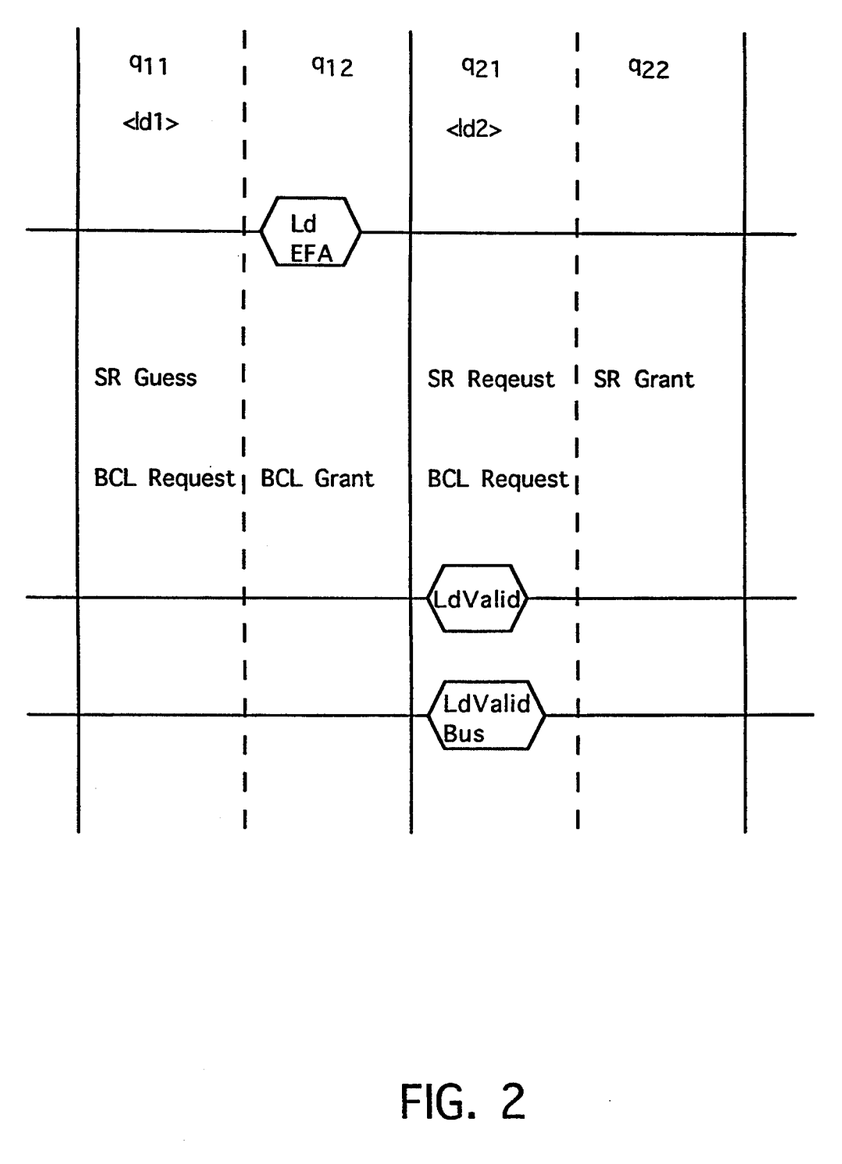
FIG. 2 is a timing diagram illustrating the processing of bus requests received by the memory arbitration unit for the system of FIG. 1.

A timing diagram illustrating a circumstance when memory arbitration unit 18 simultaneously receives an SR "guess" and a BCL request is provided in FIG. 2. Two pipe stages, each having-two phases, are illustrated in FIG. 2, with the stages generally identified by index $q_{xy}$, with x representing the pipe stage and y representing the phase. In general, three pipe stages are provided (with only the first two illustrated in FIG. 2.) The three stages are stage 0, stage 1 and stage 2. A new instruction address is issued and instruction words are read out at stage 0—the "instruction fetch" stage. Instructions are decoded and operands are read out of RF 20 at stage 1—the "instruction issue" stage. Finally, in stage 2, the instructions are executed and results are returned to register file 20.

In the example of FIG. 2, at $q_{11}$ an SR "guess" is asserted by SR 14 in response to a load <ld1> issued by ID 24. Simultaneously, a BCL request is asserted. As the BCL request has a higher priority than the SR "guess", a BCL grant is issued by memory arbitration unit 18 at $q_{12}$. If SR is, in fact, ready to assert data onto the bus at $q_{12}$, SR 14 must place the data into single entry queue 28 during $q_{12}$ pending a subsequent SR bus request. At $q_{21}$, BCL responds to the BCL bus grant issued in $q_{12}$ by driving bus 32, as illustrated in FIG. 2 by a LdValid signal and a LdData bus signal.

If the "guess" was correct, at $q_{21}$, SR 14 upgrades its bus access to a "request", rather than a "guess". The SR request is granted at $q_{21}$. In a subsequent clock cycle (not shown) SR drives bus 16. If a second BCL request is asserted at $q_{21}$, the SR request, having a higher priority, is granted, at $q_{21}$. BCL 12 must store the data in four-entry queue 14 and re-request bus access at a subsequent clock cycle (not shown).

Thus, a SR 14 is provided with a single entry queue and an additional level of priority, namely the SR "guess", is required, resulting in added circuitry and complexity. Although this architecture and arbitration scheme adequately prevents a deadlock condition, the added circuitry and complexity is undesirable. Further, in circumstances where a tight loop and <load> and <lda> signals are issued by ID 24, the queue of BCL 12 is frequently filled necessitating frequent score boarding, resulting in frequent disqualification of data previously retrieved by either the SR or AGU.

Accordingly, an improved architecture and arbitration scheme is desired for resolving the aforementioned bus contention problems which does not require a "guess" mechanism and which does not require that the SR be provided with a single entry queue.

SUMMARY OF THE INVENTION

In accordance with the invention, an improved method and apparatus for arbitrating bus access in a computer system having memory coprocessors is provided.

The apparatus of the invention provides a memory access architecture within a microprocessor having a core memory, a data cache and a stack RAM, with the memory access architecture having a set of memory coprocessors including an address generation means for calculating effective addresses for memory access requests, with the address generation means providing the effective address on a single clock cycle basis, bus control logic means for retrieving data from the core memory, with the bus control logic means retrieving data on a multiple clock-cycle basis, and a combined data cache and stack RAM access means for accessing either of said data cache and a stack RAM. The architecture also includes memory bus means for transmitting data and a memory arbitration means, connected to the memory bus and to each of the memory coprocessor means, the memory arbitration means for receiving bus access requests from one or more of the memory coprocessors and for granting access to the bus to one of the coprocessors at a time, the memory arbitration unit determining which of the memory coprocessors asserts data onto the bus when more than one of the set of memory coprocessors requests bus access at substantially the same time.

In a preferred embodiment, the data cache unit and stack RAM unit share common decoders, sense amps, and data paths. The memory arbitration means grants access to one of the single cycle memory coprocessor means ahead of the multiple-cycle bus control logic unit means. The bus control logic means includes a multiple entry queue means for storing retrieved data. The memory arbitration means grants bus access to one of the one of the single cycle memory coprocessor means when the queue of the multiple cycle bus controller unit is not full. Access to the memory bus means is granted to the multiple cycle bus controller means when the queue means of the multiple cycle bus controller means becomes full.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

A microprocessor memory coprocessor architecture and a method for memory arbitration for use with the memory coprocessors is a disclosed. In the following description for the purpose of explanation, numerous details are set forth to provide a thorough understanding of the present invention, however, it will be apparent to one skilled in the art these details are not required in order to practice the present invention. In other instances, well known structures and circuits are shown in block diagram form in order not to obscure fundamental aspects of the invention.

Figure 3:
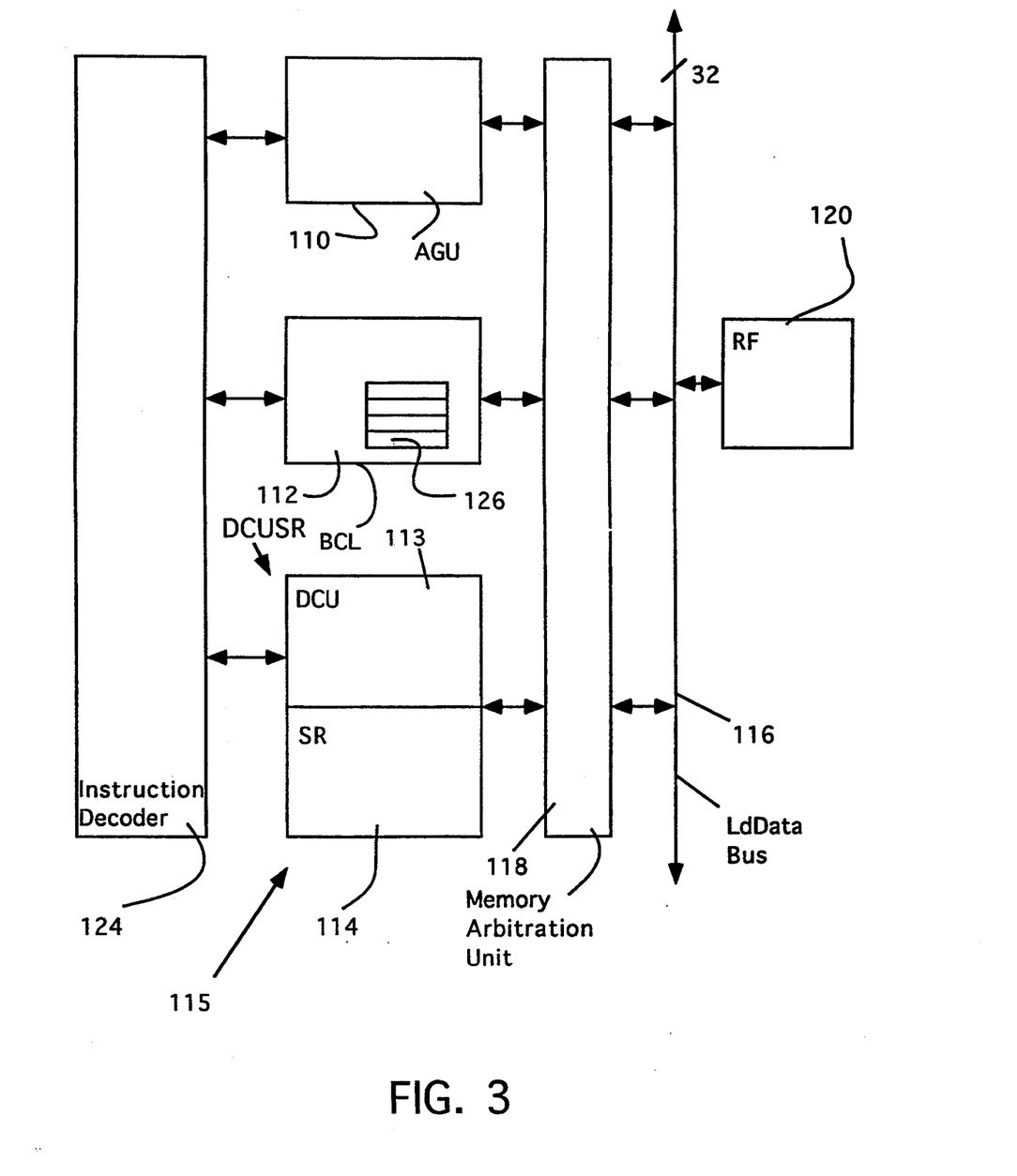
FIG. 3 is a block diagram illustrating a portion of a computer system configured in accordance with a preferred embodiment of the invention, having a set of memory coprocessors and a memory arbitration unit, and having a data cache unit integrally combined with a stack RAM unit.

Referring to FIGS. 3 through 8, preferred embodiments of the invention will now be described. FIG. 3 illustrates a memory coprocessor and memory arbitration portion of a microprocessor 100. Microprocessor 100 includes numerous components and sub-components which are not pertinent to the invention and are not illustrated in FIG. 3. Only those components of microprocessor 100 which are particularly relevant to the invention are illustrated in FIG. 3. In particular, FIG. 3 illustrates an address generation unit (AGU) 110, a bus control logic unit (BCL) 112 and a combined data cache unit/stack RAM (DCUSR) 115. AGU 110, BCL 112 and DCUSR 115 are each connected to a data bus 116 which is in turn connected to a register file (RF) 120. A memory arbitration unit 118 is connected to data bus 116 and to each of AGU 110, BCL 120 and DCUSR 115 for arbitrating bus usage.

AGU 110, BCL 112 and DCUSR 115 represent a set of memory coprocessors which each receive memory access commands or opcodes from an instruction decoder (ID) 124. AGU 110 is a single cycle memory coprocessor which receives <lda> signals from ID 124. As a single cycle coprocessor, AGU 110 must assert data onto bus 116 in a clock cycle immediately following receipt of the <lda> signal from ID 124. BCL 112 is a multiple cycle memory coprocessor which retrieves data from a main memory (not shown) and is subject to an arbitrary latency period and may therefore attempt to assert data onto bus 116 at an arbitrary number of clock cycles following receipt of a <load> signal from ID 124. BCL 112 includes a 4-entry queue 126 for temporarily storing data if access to bus 116 is initially denied.

DCUSR 115 is an integrated combination of a stack RAM unit and a data cache unit and can operate either as a single cycle or multiple cycle unit, depending upon the memory operations to be performed. As will be described in more detail below, by integrally combining a stack RAM and a data cache unit, the SR guess mechanism described above with reference to FIG. 1 is not required. Further, the single entry queue incorporated within the stack RAM of FIG. 1 is also not required. As a result, memory arbitration performed by memory arbitration unit 118 is simpler, faster, and requires less circuitry.

Although DCUSR 115 is a single integral unit, it is sometimes useful to describe the data cache unit functions and the stack RAM functions of DCUSR 115 separately. Accordingly, in FIG. 3 and in the remaining descriptions, the data cache unit portion of DCUSR is identified by reference numeral 113 and the stack RAM portion is identified by reference numeral 114.

Before describing the memory arbitration scheme, a summary of the functions of ID 120, AGU 110, BCL 112, DCUSR 115 and RF 120 is provided.

ID 124 issues memory-side instruction opcodes, operation types, and memory operand addresses for DCUSR 115 to decode and execute.

AGU 110 may be an otherwise conventional address generation unit which receives <lda> commands from ID 124 and provides an effective address to BCL 112 or DCUSR 115 to determine whether a corresponding memory access command issued by ID 124 should be executed by DCUSR 115 or BCL 112. AGU 110 also sends an aligned/unaligned detection signal to both DCUSR 115 and BCL 112 to control internal operations of those components.

BCL 112 provides information to the DCU 113 of DCUSR 115 to allow DCUSR 115 to determine whether it should execute a memory access issued by ID 124. BCL 112 also sends information such as data cache fill operation information to DCUSR 115 to allow the data cache portion units thereof to begin internal replacement. DCU 113 portion of DCUSR 115 transmits information such as data cache load miss information to BCL 112, on a cache miss, to allow BCL 112 to retrieve a previous access and effectively re-execute the access.

RF 120 provides data on STORE operations for the data cache unit portion of DCUSR 115 to allow the data cache to update its entries. If data corresponding to a memory access is stored within the data cache arrays of DCUSR 115, then DCUSR 115 sends information regarding load operations to RF 120 to allow RF 120 to update its entries. Similarly, for the stack RAM portion of DCUSR 115, RF 120 transmits data on stack frame PUSH operations to the SR to allow the SR to update its entries and the SR sends information on stack frame pop operations to RF 120 to update its entries.

Memory arbitration unit 118 arbitrates for access to data bus 116 among AGU 110, DCUSR 115, and BCL 112.

DCUSR 115 consists of an on-chip 1 kilobyte data cache (DCU) and an on-chip 1.5 kilobyte stack RAM (SR) with the DCU and SR data RAM arrays sharing common decoders, sense amps and data paths. DCUSR 115 interfaces with five other units of microprocessor unit 100 including ID 124, AGU 110, BCL 112, RF 120, memory arbitration unit 118 and a direct memory access unit (DMA), not shown in the figures.

DCU 113 temporarily stores data otherwise found in a main memory (not shown) to allow faster access to the data. When a load instruction is issued to instruction decoder 124, DCU 113 determines whether the data to be retrieved is stored within its internal data arrays and, if the data is found therein, the data is retrieved and transmitted to RF 120 during an immediately subsequent clock cycle. However, when DCU 113 does not have the data that the load instruction is requesting, BCL 112 is notified to fetch the desired data from the external memory. The data is transmitted directly to register file 120 from the external memory, at which time BCL 112 transmits information to the DCU 113 notifying the DCU to fetch the data from the register file. DCU 113 uses the retrieved data to update or replace its own data cache entries.

DCU 113 is effectively a single cycle memory coprocessor which returns data from normal load and store instructions in one clock cycle if the data is available in its internal memory cache. If the data is not available within the cache memory, then a determination there of is made within one clock cycle as well. Therefore, as far as memory arbitration is concerned, DCU 113 is preferably granted access to bus 116 immediately.

SR 114 of DCUSR 115 is a 1.5 kilobyte on chip RAM array with a portion of its memory array mapped into user memory space and a remaining portion accessible only through microcode commands. SR array 114 is primarily used as an interrupt address table for high priority interrupts, separate scratch registers for DMA channels (not shown), fast access user space RAM, a local register frame cache for CALLS and RETURNS, microcode scratch space, and an ICE microcode scratch space.

With the foregoing summary of the architecture of the coprocessors in mind, the arbitration of memory request by the coprocessors will now be described with reference to the timing diagrams of FIGS. 4, 5, 6 and 7.

Figure 4:
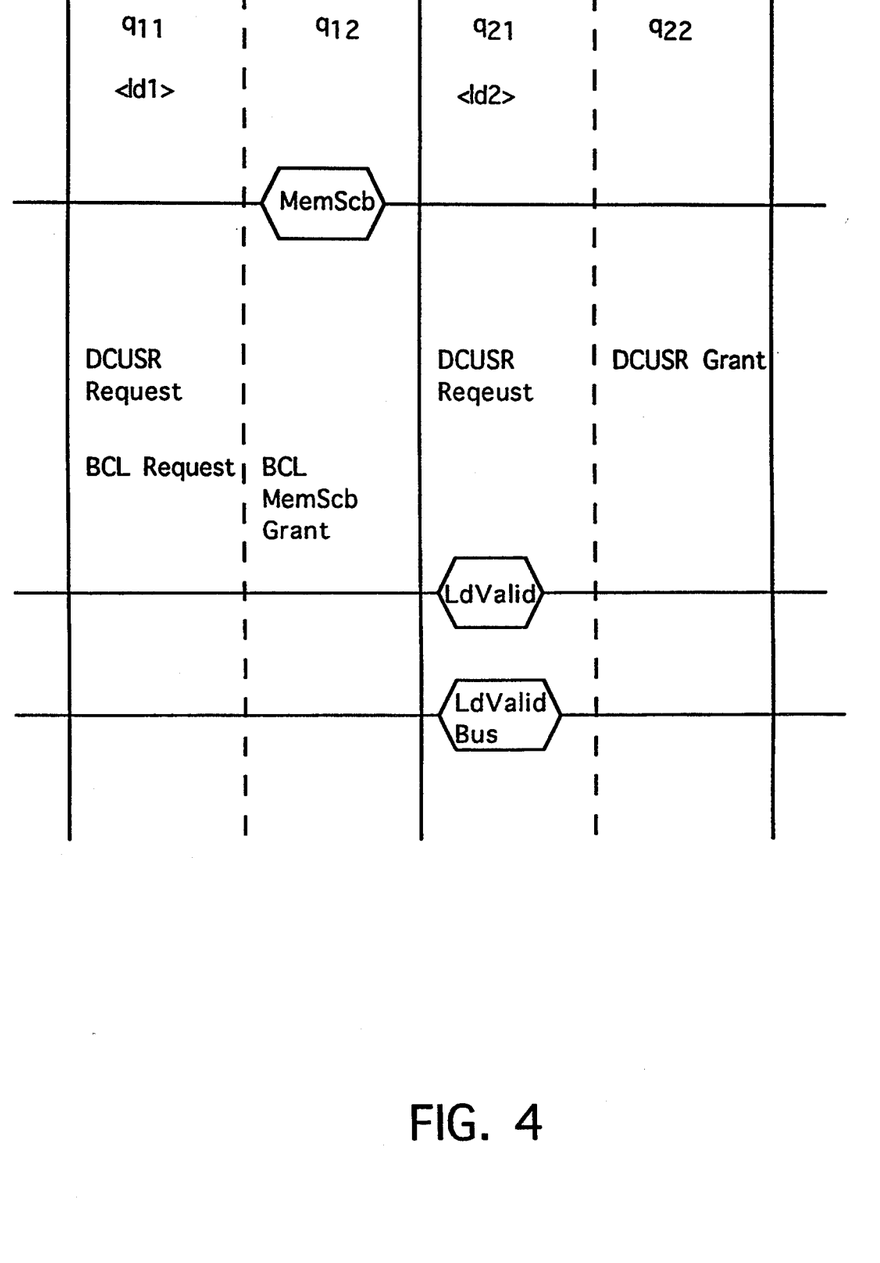
FIG. 4 is a timing diagram illustrating the processing of bus requests received by the memory arbitration unit of FIG. 3, wherein bus requests are received by the memory arbitration unit simultaneously from both a bus control unit and a combined data cache/stack RAM unit, wherein a multiple-entry queue of the bus control unit is full.

FIG. 4 illustrates a circumstance where a DCU request and a BCL request are received simultaneously by memory arbitration unit 118. In FIG. 4 the requests are received at $q_{11}$, with the first index of "q" identifying the pipe and the second index identifying the phase. With regard to FIG. 4, it is assumed that the multiple-input queue 126 of BCL 112 is full, such that the BCL must return data immediately.

In general, an arbitration hierarchy priority is imposed wherein requests from DCUSR 115 and AGU 110 are granted ahead of any grant to BCL 112. As noted above, BCL 112 is provided with a multiple entry queue 126 to allow the BCL to store data in the event that access to bus 116 is deferred. AGU 110 and DCUSR 115 are of equal priority. Contention between these units is not possible since AGU 110 responds only to <lda> commands and DCUSR 115 responds only to <load> commands. AGU 110 and DCUSR 115 cannot request bus access simultaneously.

In FIG. 4, because the queue of BCL 112 is full, BCL 112 pulls the memory scoreboard of memory arbitration unit 118 to effectively disable memory bus access by all other components. The memory scoreboard signal is illustrated at $q_{12}$ of FIG. 4. Having pulled the memory scoreboard at $q_{12}$, BCL 112 is allowed to assert data onto bus 116 at $q_{21}$. DCUSR 115 must reassert its bus request at $q_{21}$. The DCUSR request is granted at $q_{22}$ allowing the DCU to drive bus 116 at a later clock cycle (not shown). The access to bus 116 by BCL 112 at $q_{21}$ is illustrated in FIG. 4 by an <Ldvalid> signal and a <Lddata> bus signal.

Thus, when the input queue of BCL 112 is full, BCL 121 pulls the memory scoreboard to gain immediate access to the bus, thereby requiring any simultaneously received requests from the other coprocessors to be reasserted. Although FIG. 4 illustrates a circumstance where the BCL, with a full input queue, gains priority over a DCUSR request, the same occurs with an AGU request received simultaneously with the BCL request.

Figure 5:
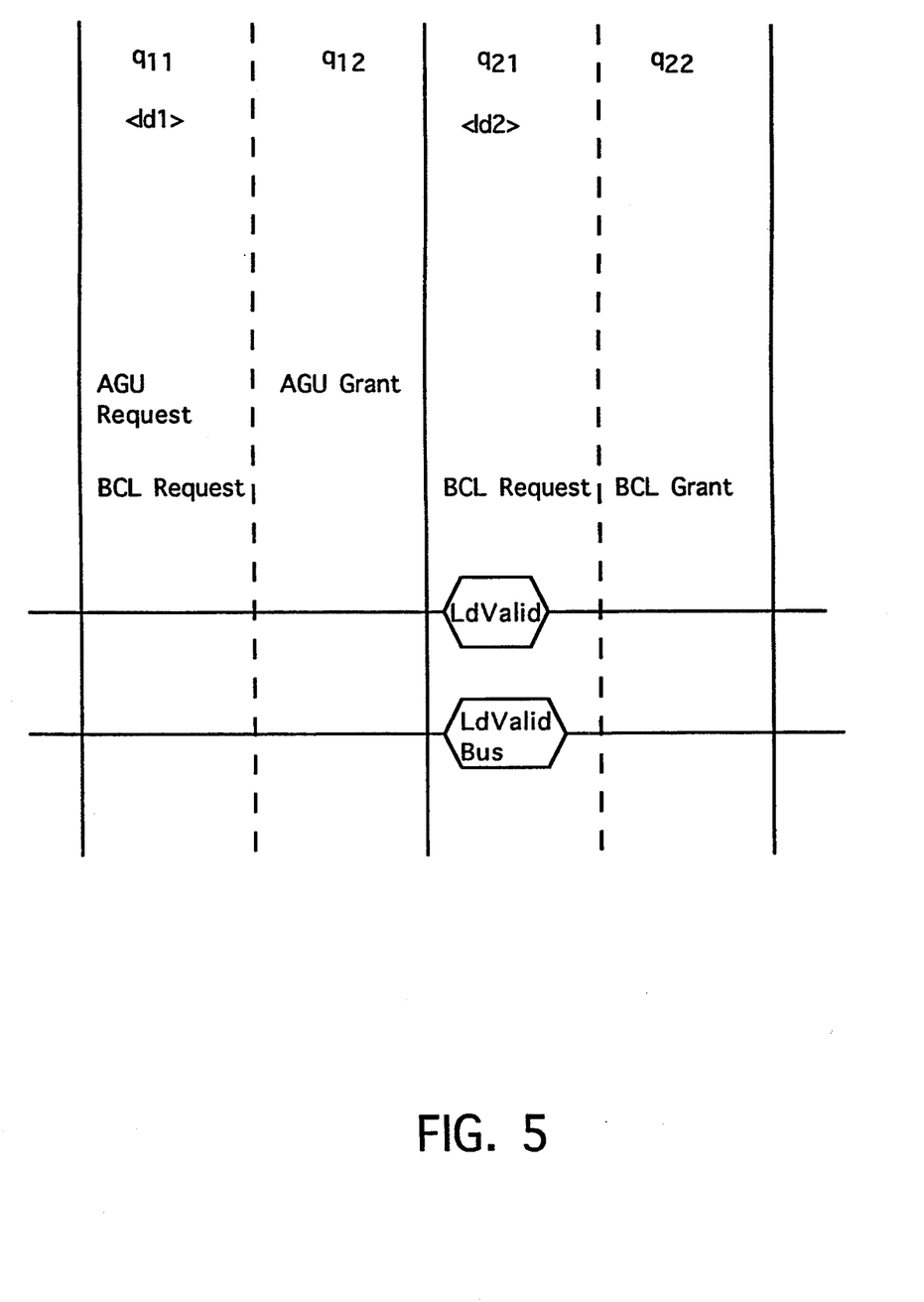
FIG. 5 is a timing diagram illustrating the processing of bus requests received by the memory arbitration unit of FIG. 3, wherein bus requests are received by the memory arbitration unit simultaneously from both a bus control unit and a address generation unit.

FIG. 5 illustrates a circumstance where an AGU request is received simultaneously with the BCL request, but wherein the BCL input queue is not full. In FIG. 5, the AGU request is granted at $q_{12}$ and the AGU drives the bus at $q_{21}$. BCL 112 stores its data in queue 126 at $q_{12}$ and reasserts a bus request at $q_{21}$ which is granted at $q_{22}$. BCL 112 then drives the bus using data stored in queue 126 at a later clock cycle (not shown.)

Figure 6:
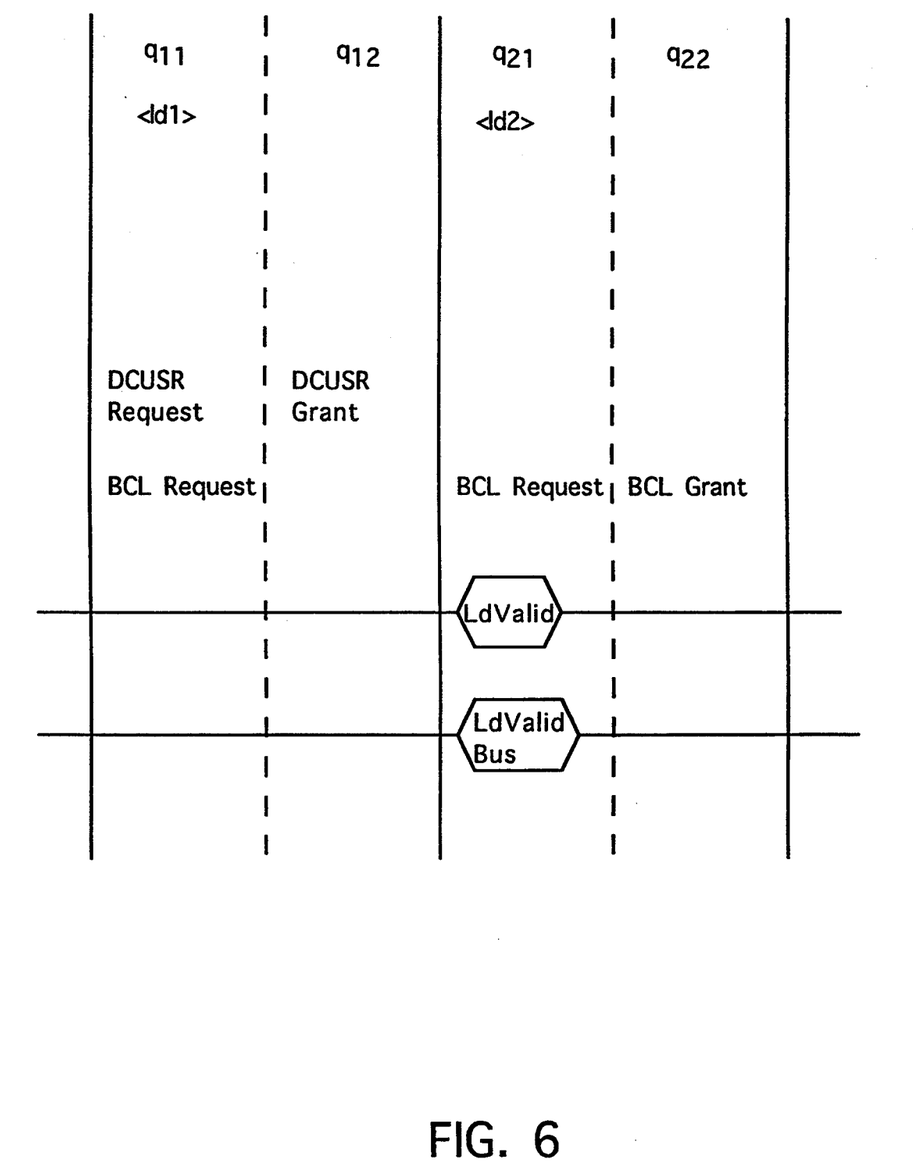
FIG. 6 is a timing diagram illustrating the processing of bus requests received by the memory arbitration unit of FIG. 3, wherein bus requests are received by the memory arbitration unit simultaneously from both a bus control unit and a data cache portion of the combined data cache/stack RAM unit, and wherein the multiple-entry queue of the bus control unit is not full.

FIG. 6 illustrates a circumstance where a DCUSR 115 request and a BCL request are received simultaneously at $q_{11}$. Here, the BCL queue is not full and DCUSR 115 is granted bus access at $q_{12}$. However, whether DCUSR 115 is actually capable of driving data onto the bus depends upon whether DCUSR 115 has the data available within its data cache arrays for placing on the bus. This depends upon the specific operation performed by the DCUSR. In the case of a data cache access, DCUSR 115 examines the data cache arrays of DCU 113 to determine if the requested data is stored therein. If a data cache hit occurs, that is, if the data is found in the cache, then DCUSR 115 drives bus 116 at $q_{21}$. However, if there is a data cache miss, that is the data is not found within the data cache, then no operation is performed by DCUSR 115 at $q_{21}$.

For a stack RAM operation performed by DCUSR 115, no cache dependency occurs, but the stack RAM is only capable of driving the bus on the following cycle if the data corresponding to the effective address calculated by AGU 110 is within the SR. In FIG. 6, <Ldvalid> is only asserted if valid data is placed on the bus. The data to be placed on the bus is only valid if the effective address of the memory request is within either DCU 113 or SR 114. Hence, there must either be a cache hit or a stack RAM hit for <Ldvalid> to be asserted. If the requested data is not in either the SR or the DCU, <Ldvalid> is simply not asserted, and any data placed on the bus is ignored or disqualified.

In the event that the BCL multiple entry $q_{21}$ is full when an SR-type DCUSR request and the BCL request are simultaneously asserted, BCL 112 pulls the memory scoreboard forcing DCUSR 115 to reassert the SR access request at a subsequent dock cycle. However, unlike the coprocessor architecture illustrated in FIG. 1 wherein the SR requires a single entry queue to accommodate storing the SR data, no such single entry queue is required in the improved architecture of FIG. 3. Further, no "guess" mechanism is required. In the system of FIG. 1, a "guess" mechanism is employed because the SR must wait unit the AGU calculates the effective address before the SR can determine whether it (the SR) contains the data corresponding to the effective address. In the system of FIG. 1, an immediate SR request is not issued since actual SR memory retrieval is fairly rare and numerous clock cycles would be wasted by issuing an immediate SR before determining whether the SR is actually capable of driving the bus with the requested data. With the configuration of memory coprocessors of FIG. 3, wherein the SR is integrally merged with a data cache unit, an SR "guess" mechanism is not needed. When the DCUSR receives a <load> command, it immediately issues a bus request. Although it is possible that the data for the <load> command may not be included either within the stack RAM or the data cache portions of DCUSR 115, such is fairly unlikely. In other words, the data cache unit has a fairly high hit rate. Thus, a circumstance can arise where the effective address, once calculated by the address generation unit, is not in either the stack RAM or the data cache unit portions of DCUSR and a clock cycle will be wasted. However, such is a fairly rare case and relatively few clock cycles are wasted by automatically having DCUSR 115 issue a bus request upon receiving a <load> instruction. Without a "guess" mechanism, no separate single entry queue is required within DCUSR 115.

Figure 7:
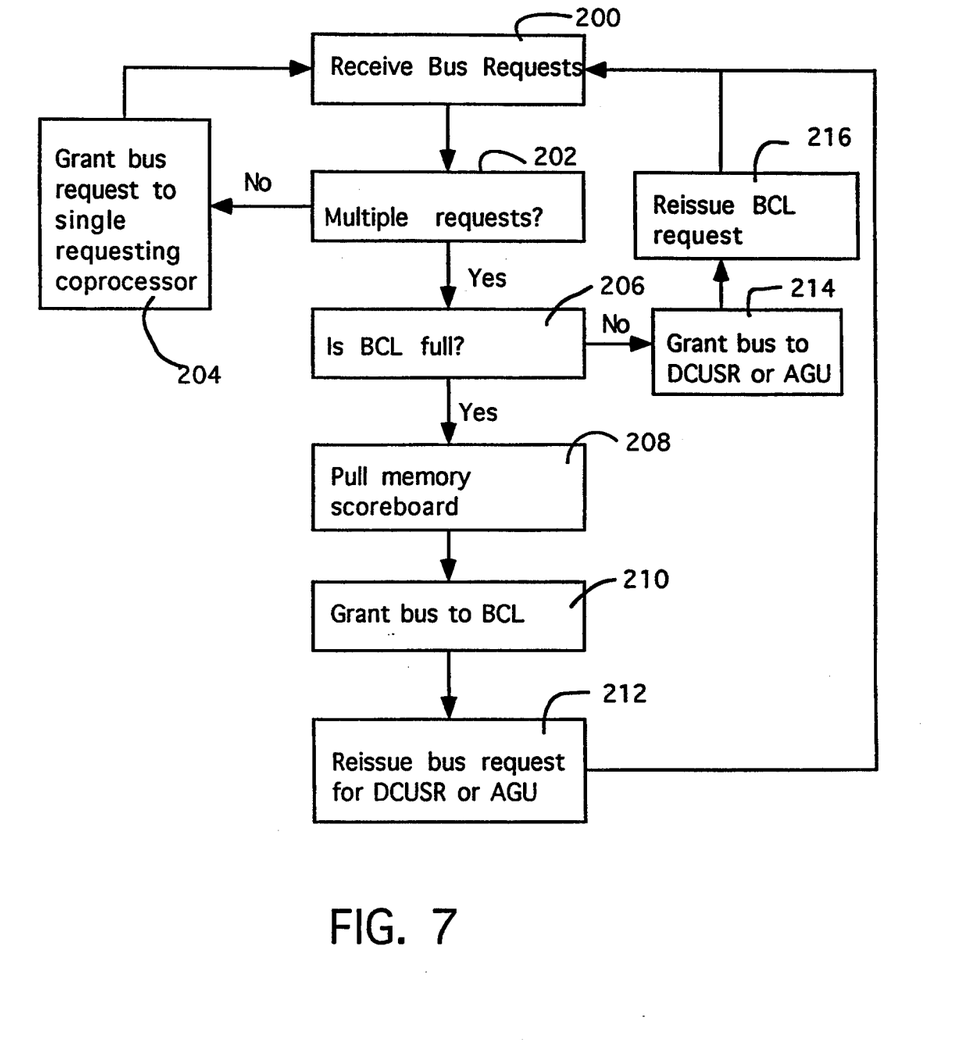
FIG. 7 is a flow diagram of a method of memory arbitration in accordance with the invention.

FIG. 7 illustrates a method of memory arbitration for a memory coprocessor architecture having an AGU, BCL, DCUSR and a memory arbitration unit. Initially, at step 200, bus requests are received by the memory arbitration unit. At 202, the memory arbitration unit determines whether more than one request has been received. In particular, the memory arbitration unit determines whether both a BCL and a DCUSR request is received or whether both a BCL and an AGU request is received. As described above, the DCUSR and the AGU are mutually exclusive devices which cannot both seek memory access simultaneously.

If only a single bus request is received, then the device requesting the bus is granted bus access at step 204 and execution returns to step 200. If a bus contention problem occurs, then execution proceeds to step 206 where a determination is made as to whether the BCL queue is full. If full, the BCL pulls the memory scoreboard effectively notifying all other relevant units that the BCL must transmit data in the next clock cycle or data will be lost. The memory scoreboard is pulled at step 208. The BCL then drives the bus at step 210. The conflicting bus request asserted by either the AGU or the DCUSR is reissued at 212 and execution returns to step 200.

If at step 206, the BCL multiple entry queue was not full, then execution proceeds to step 214, where the higher priority AGU or DCUSR request is granted. The BCL reissues its request at 216 and execution again proceeds to step 200. The steps illustrated in FIG. 7 are not necessarily all performed within the memory arbitration unit but rather represent the process flow of the cooperation of the elements.

Figure 8:
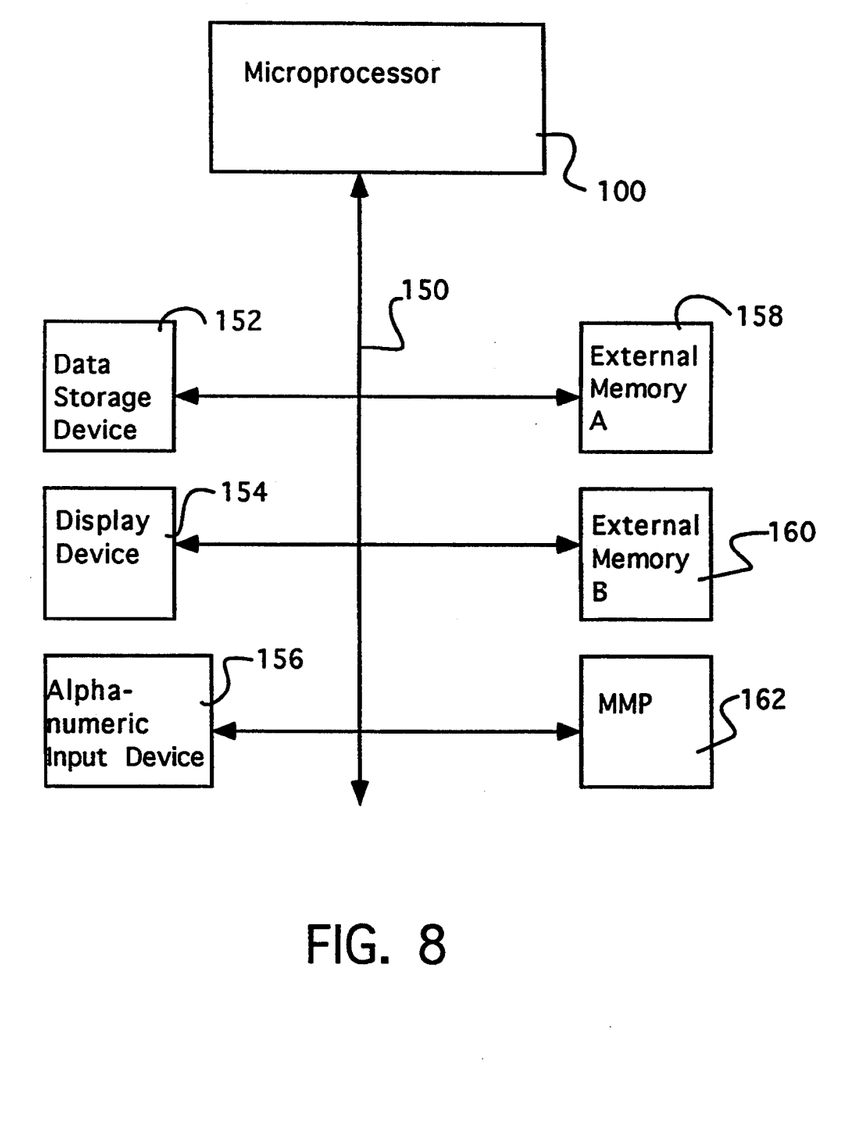
FIG. 8 is a block diagram of a computer system incorporating the memory coprocessor architecture of FIG. 3.

FIG. 8 illustrates a computer system having a microprocessor incorporating the coprocessor architecture and arbitration scheme of the invention. In FIG. 8, microprocessor 100 is shown connected to a set of off-chip components via a system bus 150. In particular, microprocessor 100 is connected to a data storage device 152, a display device 154, an alphanumeric input device 156, a first external memory 158, a second external memory 160, and an memory mapped peripheral device (MMP) 162. The first and second external memories may be either random access memory for storing information and instructions for the microprocessor or read only memory for storing static information and instructions for the microprocessor. Other external memory types may be alternatively employed. The alphanumeric input device is preferably a keyboard. The data storage device is preferably a magnetic disk or disk drive provided for storing program information and instructions. The display device may be a conventional CRT. The memory mapped peripheral device may be a conventional serial input/output device for allowing the microprocessor to communicate with serial devices, such as a mouse. It should be understood that some environments of the present invention may contain all or merely a portion of the components. The microprocessor is preferably comprised of transistor circuits, readily manufacturable using well known complementary metal oxide semiconductor (CMOS) technology.

Additional details regarding microprocessor 110 can be found in U.S. patent application Ser. No. 08/032,968, entitled "Method and Apparatus for Using a Direct Memory Access Unit and a Data Cache Unit in a Microprocessor", filed Mar. 18, 1993 and U.S. Patent application Ser. No. 08/040,675, entitled "Method and Apparatus for Dynamically Expanding the Pipeline of a Microprocessor, filed Mar. 31, 1993, both of which are incorporated herein by reference.

The memory arbitration scheme and the coprocessor system described thus far may be implemented in a variety of microprocessor computer systems but is particularly well suited for use in the Intel 960 CF microprocessor provided by Intel Corporation of Santa Clara Calif., the assignee of rights to the invention of the present application.

While certain exemplary embodiments have been described and shown in the accompanying drawings, it is to be understood that such embodiments are merely illustrative of and not restrictive On the broad invention, and that this invention is not limited to the specific constructions and arrangements shown and described.

What is claimed is:

1. A memory access device within a microprocessor, said memory access device comprising:
a set of memory coprocessors, each connected to a memory bus, including an address generation unit, a bus controller unit, and a combined data cache unit and stack RAM unit, said data cache unit and stack RAM unit sharing common decoders, sense amps, and data paths, wherein said address generation unit and said combined data cache unit and stack RAM unit are single-cycle memory coprocessors and said bus controller unit is a multiple-cycle memory coprocessor with said bus controller unit including a multiple entry queue; and
a memory arbitration unit connected to said memory bus and to each of said memory coprocessors, said memory arbitration unit receiving bus access requests from one or more of said memory coprocessors and granting access to said bus to one of said coprocessors at a time, said memory arbitration unit determining which of said memory coprocessors asserts data onto said bus if more than one of said memory coprocessors requests bus access at substantially the same time, said memory arbitration unit recognizing said combined data cache unit and stack RAM unit as a single entity for arbitration purposes; wherein said memory arbitration unit grants bus access to one of said single cycle memory coprocessor units if said queue of said bus controller unit is not full and grants access to said memory bus to said bus controller unit if said queue of said multiple-cycle bus controller unit is full.

2. A memory access device within a microprocessor connected to a core memory, said memory access device comprising:

a set of memory coprocessors including an address generation means for calculating effective addresses for memory access requests, bus control logic means for retrieving data from the core memory, and a combined data cache and stack RAM access means for accessing data, said combined data cache and stack RAM means having a data cache and a stack RAM sharing common decoders, sense amps, and data paths, wherein said generation means and said combined data cache and stack RAM means are single cycle memory coprocessors and said bus control logic means is a multiple-cycle memory coprocessor, with said bus control logic means including a multiple-entry queue means for storing retrieved data;

memory bus for transmitting data; and memory arbitration means, connected to said memory bus and to each of said memory coprocessor means, for receiving bus access requests from one or more of said memory coprocessors and for granting access to said bus to one of said coprocessors at a time, said memory arbitration means determining which of said memory coprocessors asserts data onto said bus if more than one of said memory coprocessors requests bus access at substantially the same time, said memory arbitration means recognizing said combined data cache and stack RAM means as a single entity for arbitration purposes; wherein said memory arbitration means grants bus access to one of said single cycle memory coprocessor means if said queue means of said bus control logic means is not full and grants access to said memory bus to said bus control logic means if said queue means of said bus control logic means is full.

3. A method for arbitrating bus access by a set of memory coprocessors including an address generation unit, a bus control logic unit, and a combined stack RAM and a data cache unit, each connected to a memory arbitration unit, said stack RAM and data cache sharing common decoders, sense amps, and data paths, wherein said memory arbitration unit recognizes said combined data cache and stack RAM unit as a single entity for arbitration purposes, and wherein said address generation unit and said combined data cache unit and stack RAM unit are single-cycle memory coprocessors and said bus control logic unit is a multiple-cycle memory coprocessor with a multiple entry queue, said method comprising the steps of:

receiving bus access requests from one or more of the memory coprocessors;

determining whether more than one bus access request is received;

granting access to a requesting memory coprocessor, if only a single bus request is received; and determining whether one of two requesting coprocessors is the bus control logic unit, and, if so, determining whether the multiple entry queue of the bus control logic unit is full, and granting bus access to said bus control logic unit, if said queue is full and granting bus access to the other of said requesting coprocessors if said queue is not full.

4. A method for processing memory bus activity on a bus connected to a set of memory coprocessors including an address generation unit, a bus control logic unit, and a combined stack RAM and data cache unit, said stack RAM and data cache unit sharing common decoders, sense amps, and data path, said method comprising the steps of:

simultaneously dispatching bus requests from the combined stack RAM and data cache unit and from the bus control logic unit during a first phase of a first dock cycle;

determining whether a queue within the bus control logic unit is full and, if full, granting access to the bus control logic unit during a second phase of the first clock cycle, dispatching valid data from the bus control logic unit onto the bus during a first phase of a second clock cycle, redispatching the bus request from the combined stack RAM and data cache unit also during the first phase of the second dock cycle, and granting access to the combined stack RAM and data cache unit during a second phase of the second dock cycle; and if said queue of said bus control logic unit is not full, then granting access to the combined stack RAM and data cache unit during the second phase of the first clock cycle, dispatching valid data from the combined stack RAM and data cache unit onto the memory bus during the first phase of the second clock cycle, redispatching the bus access request from the bus control logic unit during the first phase of the second clock cycle, and granting access to the bus control logic unit during the second phase of the second dock cycle.

* * * * *

UNITED STATES PATENT AND TRADEMARK OFFICE
CERTIFICATE OF CORRECTION

| | | |
|---|---|---|
| PATENT NO. | : | 5,388,245 |
| DATED | : | February 7, 1995 |
| INVENTOR(S) | : | Jimmy Wong |

It is certified that error appears in the above-identified patent and that said Letters Patent is hereby corrected as shown below:

In column 3 at line 31 delete "dock" and insert --clock--

In column 8 at line 67 delete "dock" and insert --clock--

In column 12 at line 31 delete "dock" and insert --clock--

In column 12 at line 41 delete "dock" and insert --clock--

In column 12 at line 44 delete "dock" and insert --clock--

In column 12 at line 57 delete "dock" and insert --clock--

Signed and Sealed this

Twenty-fifth Day of February, 1997

Attest:

BRUCE LEHMAN

*Attesting Officer*    *Commissioner of Patents and Trademarks*